May 14, 1963 H. K. HEBELER 3,089,318
HYPERSONIC COOLING SYSTEM
Filed Jan. 10, 1961 2 Sheets-Sheet 1
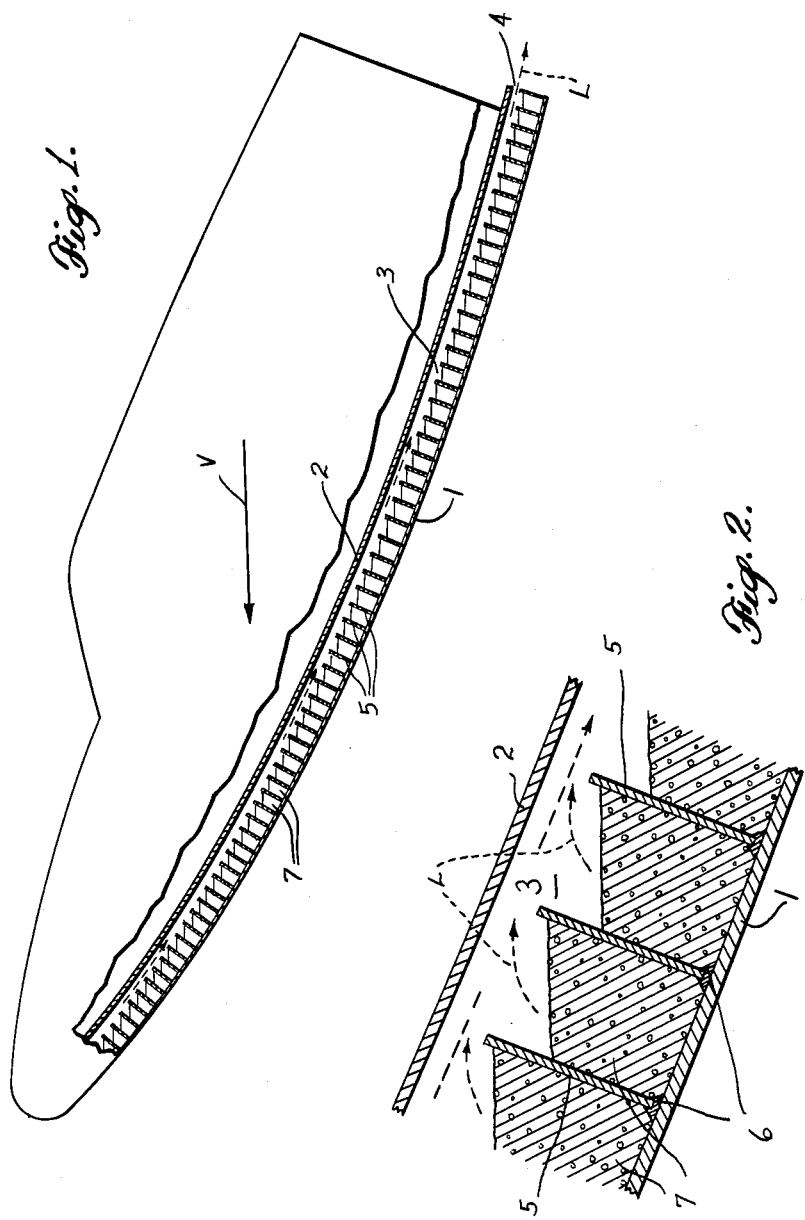
INVENTOR.
HENRY K. HEBELER
BY
Reynolds & Christensen
ATTORNEYS INVENTOR.
HENRY K. HEBELER
BY
Reynolds + Christensen
ATTORNEYS

3,089,318
HYPERSONIC COOLING SYSTEM
Henry K. Hebeler, Bellevue, Wash., assignor to Boeing Airplane Company, Seattle, Wash., a corporation of Delaware
Filed Jan. 10, 1961, Ser. No. 81,746
7 Claims. (Cl. 62—467)

This invention deals with the problem of cooling a hypersonic aerial vehicle, such as a manned and maneuverable vehicle or a guided or ballistic missile, or the like, moving through the earth's atmosphere and heated by friction therewith. With a given configuration and structural material there is a limiting speed at each altitude at which the structure of such a vehicle suffers prohibitive strength losses when exposed to aerodynamic heating. Given better high temperature structural material, or given insulators superior in kind or in application to the structure than those now known, greater velocities may be safely achieved or endured. The present invention provides better insulation in that it is superior in application to the structure, than any known to me.

Ablative coatings to absorb and dump the heat are known, but their use is not practical on any except short-lived vehicles. Thermal insulative materials are likely to be too heavy. A different approach, well suited to longer-lived vehicles, employs a coolant. Of various coolants available, lithium appears eminently suitable for various reasons; not only is it the lightest metal, but it absorbs a large quantity of heat in changing from its liquid to its vaporous phase, in addition to an appreciable amount in changing from its normal solid state to a liquid. In other words, it has a high latent heat of fusion and a high latent heat of vaporization. Compared to a pound of water, a pound of liquid lithium absorbs eight times as much heat in passing to the vapor phase, and compared to ablating quartz lithium is twice as good, at fairly high heat input rates. The total heat absorbing capability of a pound of lithium has been calculated at 11,000 B.t.u.'s. See preprint 60-44 of the American Astronautical Society, dated January 18-21, 1960.

One difficulty encountered in the use of lithium as a coolant lies in the fact that, as the rate of heat input increases and approaches or reaches the maximum rate at which a pool of lithium can absorb the heat, nucleate boiling ceases and film boiling begins. During film boiling the transfer of heat from the structure to the liquid lithium must be through the interposed film, hence is primarily or wholly by radiation, and not by conduction, hence is far less efficient. During nucleate boiling there is but slight difference in temperature between the structure and the lithium, but during film boiling the temperature difference is large, and the structure becomes overheated, and is quite likely to burn out in minimum time.

The present invention deals with the problem just outlined. It provides a structure arranged to be cooled by a coolant such as the alkali metal lithium, which can be tipped to appreciable angles while the lithium is in liquid phase without loss of effectiveness, which greatly supplements the heat transfer surfaces in contact, and thereby defers or prevents film boiling, and which provides surfaces more favorable to the formation of the small bubbles characteristic of nucleate boiling, again promoting nucleate rather than film boiling, and avoiding burn-out of the protected structure. It also insures retention of the coolant liquid in contact with all parts of the protected surface, regardless of the attitude of that surface throughout a wide angular range.

It should be made clear that lithium is not the only suitable coolant. It is considered presently to be the best, in that it is solid at normal temperature and pressure, is very light, and absorbs a large quantity of heat before it boils, but other metals are usable, for example sodium, potassium, mercury, caesium, bismuth, magnesium, the combination sodium-potassium, or even lead. Except as the structure to be cooled may be of a material that would affect or be affected by such alternative metals under the conditions of use, they may be used in the structure of this invention, as coolants, although if weight, toxicity, or the like, are critical factors, some of these are less suitable.

The invention comprises the hypersonic aerial vehicle, including particularly its skin, and the insulating structure and the relationship of the coolant thereto and to the skin, for uses of the character described, as shown in the accompanying drawings, as described in a representative form in this specification, and as will be defined in the accompanying claims. The invention concerns also the process of cooling.

FIGURE 1 is a representation of a vehicle intended for hypersonic travel within the earth's atmosphere, with its critical surface protected by the cooling system of this invention.

FIGURE 2 is an enlarged sectional view of a portion of such surface and its cooling installation.

The vehicle for which the present invention is especially intended is one which is partially aerodynamically supported, although capable of attaining extreme altitudes and hypersonic speeds. Such a vehicle is illustrated in FIGURE 1 in an attitude such as it might assume during flight. The forward direction is indicated by the arrow V, and the outer skin is represented at 1. Stiffening and supporting structure, and spacer means have been omitted, as they do not affect this invention although they are helped by the same. The critical area most subject to aerodynamic heating, is the lower surface; the upper surface is not so critical, and while the nose surface is also critical, a component of the system of this invention is not well suited for use at the nose, and other cooling means are intended for the same.

The outer skin may be of various materials, or its inner surface at least—that which contacts the lithium (which tends to be corrosive) or other coolant—must be compatible with the coolant at the temperatures and pressures prevalent during use. Some of the materials found suitable are columbium, molybdenum, tantalum, Armco iron, austenitic stainless steels, high chromium ferritic types, low chromium steels, and low carbon steels. An austenitic stainless steel, 347 type 18–8 has been used to contain lithium, and no difficulty was encountered in its use, up to 1800° F. Other structural materials used were M-252 and Rene 41, both made by General Electric Co.

Within the outer skin 1 is a spacer inner skin 2. The material of which it is made is less critical. It may for example be a stainless steel or a super alloy. Essentially it is spaced from the outer skin to allow collection and movement of vapor in the space 3 between them. Furthermore, it is highly desirable that this space 3 be vented to the exterior, as at 4.

Figure 3:
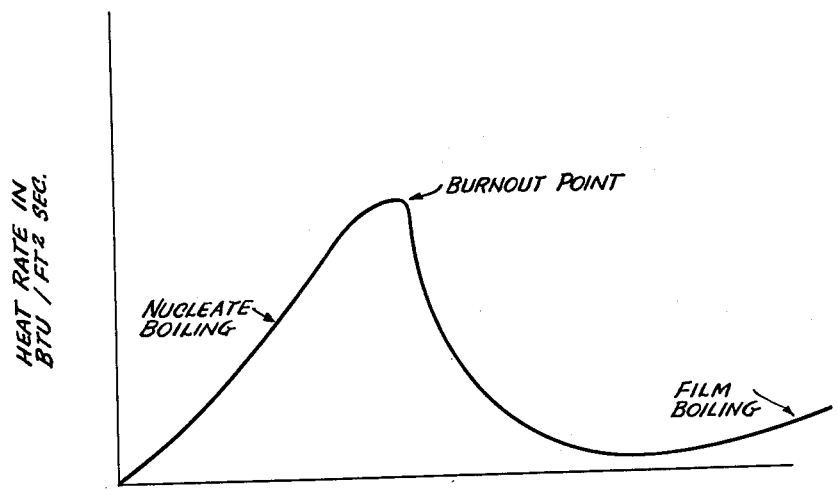
FIGURE 3 is a graph illustrating the change from a safe rate of heat input to an intolerable rate, using the cooling system of this invention.

It is the phenomenon of film boiling of the liquid lithium or equivalent metal, at high temperatures and heat input rates, that destroys its usefulness as a coolant. As FIGURE 3 shows, nucleate boiling continues in a pool of liquid lithium at increasing heat input rates, with but slight difference between the temperatures of the metal skin ($T_m$) and the temperature of the fluid ($T_f$), until at some high heat input rate nucleate boiling ceases and film boiling begins. Almost immediately the heat input rate to the liquid drops sharply and the temperature difference ($T_m - T_f$) becomes large. Just beyond the point where nucleate boiling ceases and the insulation of the film creates the larger temperature difference between skin and liquid, the structure (skin) can no longer endure the temperature, and burn-out occurs, despite the ability of the liquid still to absorb large quantities of heat because of its high latent heat of vaporization.

Clearly, the heat transfer relation between the lithium and the structure (skin) must be kept so efficient, and distributed so thoroughly throughout the liquid and over the entire surface of the skin, that nucleate boiling never ceases at any point during operations within the design range, and the burn-out point is never reached. To do this a heat conductive material is situated in good heat transfer relation to all areas of the skin, and distributed within the liquid-filled space. This heat conductive material would normally be a metal, similar to the metal of the protected structure, and operates best if brazed thereto. While a sponge-like mass of metal might serve these ends, it is preferable to employ an uninterrupted series of receptacles such as the honeycomb cells that are frequently employed as the cores of laminated structural sandwiches, shown in the drawings at 5. While in experiments (see preprint 60-44, referred to above) good heat transfer can be effected if such cells merely rest upon the skin, it is preferred to braze them to the skin at their lower edges, as shown at 6. This makes each cell leakproof at its bottom, and with the lithium distributed as at 7 throughout the multiplicity of cells, each one retains the contained lithium and transfers heat thereto in addition to the heat transferred directly through the skin. This furnishes many surfaces where nucleate boiling originates, and lessens the chances of film boiling occurring. Also, when the skin is tilted, as shown in FIGURE 1, the cell walls can be of a height to prevent material spilling of the lithium, and if greater cooling is required in certain areas the cells may be deeper in such areas, to contain more of the coolant.

The honeycombs may be of any suitable material, as for example refractory or super alloys, stainless steel, M-252, etc. A material not affected by the corrosive quality of the coolant will be employed.

Lithium melts at a relatively low temperature (357° F.) and can be poured within the cells, where it will solidify and remain solid until heated by aerodynamic friction, whereupon it will melt and eventually boil. Most of the other metals mentioned above as substitutes for the lithium can be handled similarly.

When aerodynamic heating occurs, the outer skin 1 transfers its heat directly and through the walls of cells 5 to the solid lithium within the cells of the critical area, and the lithium becomes liquid. Being contained in small individual cells, it is unlikely to run out unless the vehicle tilts farther than it is intended to. As more heating of skin 1 occurs, this is transferred by conduction through the skin and through the multitudinous walls of cells 5 to the contained lithium. The large surface area afforded by the cell walls and the excellent conduction afforded by their bonding at 6 distributes the heat, and avoids its concentration at any point, wherefore no other than nucleate boiling will occur unless the heat input rates are substantially higher than those at which film boiling would begin in structure without the honeycomb structure. The lithium, after absorbing large quantities of B.t.u.'s, begins to boil; its boiling point at a pressure of 1 mm. of mercury is 1300° F. The vapor rises in space 3, and exits at 4, dumping the heat overboard, as indicated by arrows L.

So long as liquid lithium is present in substantial quantities in the cells 5, it is clear that the skin can not become much hotter than the lithium, and the heat can be dissipated and dumped in quantities that should afford adequate cooling. This cooling will persist for only the time necessary to boil off lithium beyond a critical quantity, but by design this cooling can be effected so long as is likely to be necessary.

Figure 4:
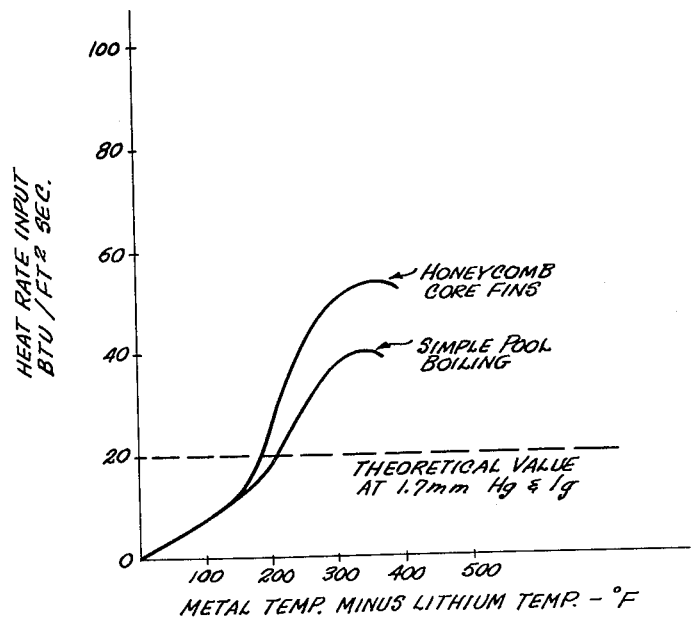
FIGURE 4 is a graph illustrating the comparison between the burn-out point when the system of the present invention is used, and when it is not.

Reference to FIGURE 4 will show the advantage resulting from the use of this invention. FIGURE 4 shows the increase in heat input rate when the honeycomb cells are employed, before the burn-out point is reached, as compared with simple pool boiling without such cells.

The cells 5 are made sufficiently deep and narrow, and are so oriented, that despite large angles of tilt of the vehicle, or of any local skin area, and despite large accelerations or decelerations such as the vehicle may be designed to withstand, the coolant while liquid will not spill from the cells, at least to an appreciable extent, but will remain always in close proximity to the heated skin 1.

I claim as my invention:

1. In combination with the skin of an aerial vehicle designed for hypersonic flight, spaced heat conductive partition means extending from heat conductive contact with said skin inwardly of the vehicle and forming a series of cells with the interior surface of said skin, a metallic charge in each of said cells, said charge consisting essentially of a metal which solidifies at ordinary room conditions and is susceptible to nucleate boiling at the characteristic skin conditions of hypersonic flight, said metal coating the entire area of the interior skin surface bounding its respective cell, and vent means communicating with each cell to remove vapor arising from the boiling metal.

2. The combination according to claim 1 wherein the partitions are joined with said interior skin surface by heat conductive brazing.

3. The combination according to claim 1 wherein the partitions extend inwardly of the vehicle at such a depth and at such an angle relative to the mean between the characteristic angles of ascent and descent of said vehicle as to maintain said coating on said area when the vehicle is tilted at such angles of ascent and descent and is accelerated or decelerated at characteristic rates.

4. The combination according to claim 1 wherein the cells are open at the ends thereof remote from said interior skin surface and communicate with the vent means through said open ends.

5. The combination according to claim 4 wherein the vent means includes an inner skin extending in spaced relation to and opposite the open ends of the cells to define a vent wall therefor.

6. The combination according to claim 1 wherein said metal is selected from the group consisting of lithium, sodium, potassium, mercury, caesium, bismuth, magnesium, combined sodium-potassium, and lead.

7. The combination according to claim 1 wherein said metal is lithium.

References Cited in the file of this patent
UNITED STATES PATENTS

| | | |
|---|---|---|
| 2,908,455 | Hoadley | Oct. 13, 1959 |
| 2,922,291 | Fox | Jan. 26, 1960 |
| 2,941,759 | Rice | June 21, 1960 |